(12) United States Patent
Wang et al.

(10) Patent No.: US 7,830,425 B2
(45) Date of Patent: Nov. 9, 2010

(54) AREAL ACTIVE PIXEL IMAGE SENSOR WITH PROGRAMMABLE ROW-SPECIFIC GAIN FOR HYPER-SPECTRAL IMAGING

(75) Inventors: Weng-Lyang Wang, Saratoga, CA (US); Shengmin Lin, Santa Clara, CA (US)

(73) Assignee: CMOS Sensor, Inc., Cupertino, CA (US)

( * ) Notice: Subject to any disclaimer, the term of this patent is extended or adjusted under 35 U.S.C. 154(b) by 378 days.

(21) Appl. No.: 12/171,351

(22) Filed: Jul. 11, 2008

(65) Prior Publication Data

US 2010/0007775 A1 Jan. 14, 2010

(51) Int. Cl.
*H04N 5/217* (2006.01)
*H04N 5/335* (2006.01)
*H01L 27/00* (2006.01)

(52) U.S. Cl. ............... 348/241; 348/297; 250/208.1

(58) Field of Classification Search ............... 348/241, 348/297, 229.1, 231.99, 211.6, 301, 308; 250/208.1; 341/155
See application file for complete search history.

(56) References Cited

U.S. PATENT DOCUMENTS 7,433,042 B1 * 10/2008 Cavanaugh et al. ......... 356/419

| 2002/0114533 | A1* | 8/2002 | Smith et al. | 382/275 |
|---|---|---|---|---|
| 2004/0021078 | A1* | 2/2004 | Hagler | 250/339.13 |
| 2005/0043902 | A1* | 2/2005 | Haaland et al. | 702/30 |
| 2007/0115440 | A1* | 5/2007 | Wiklof | 353/69 |

* cited by examiner

*Primary Examiner*—Lin Ye
*Assistant Examiner*—Trung Diep
(74) *Attorney, Agent, or Firm*—Chein-Hwa Tsao; CH Emily LLC (57) ABSTRACT

An areal active pixel image sensor (AAPS) with programmable row-specific gain is disclosed for converting hyper-spectral light image into video output signal (VOS). The AAPS includes:
  a) An areal active pixel sensor (APS) array each capable of photoelectrically converting and integrating an incident pixel light into a photoelectric signal through an integration time period TNT with a photoelectric signal gain GPE.
  b) A video output signal conditioner (VOSC), coupled to the APS array, for multiplexing and amplifying the photoelectric signals into the VOS with an electric signal gain GEE.
  c) The VOSC further programmably sets at least one of GPE and GEE to be row-specific.

Consequently, the AAPS exhibits an overall photoelectric signal gain of GOA=GPE×GEE that is row-specific and it can compensate for image signal distortion caused by non-uniform spectral response of the APS elements during hyperspectral imaging.

15 Claims, 8 Drawing Sheets

Fig. 1 Present Invention

Fig.2 Present Invention

Fig.3 Present Invention APS Array

Fig.4 Present Invention APS Circuit

Fig.5 Present Invention Electric Signal Gain Control

Fig.6 Present Invention PGA

Fig.7 Present Invention PGA Gain

AREAL ACTIVE PIXEL IMAGE SENSOR WITH PROGRAMMABLE ROW-SPECIFIC GAIN FOR HYPER-SPECTRAL IMAGING

CROSS REFERENCE TO RELATED APPLICATIONS

This application is related to the following U.S. patent application:
Title: "A Multi-resolution Image Sensor Array with High Image Quality Pixel Readout Circuitry", Inventors: Shengmin Lin, Weng-Lyang Wang. U.S. application Ser. No. 11/869,732
whose contents are incorporated herein by reference for any and all purpose and is referred to as U.S. Ser. No. 11/869,732.

BACKGROUND OF THE INVENTION

1. Field of the Invention

The present invention relates to electronic imaging devices. More specifically, the invention provides an areal active pixel image sensor for hyper-spectral imaging.

2. Description of Related Arts

FIG. A illustrates a hyper-spectral imaging environment 1 wherein a prism 2 is used to separate a broadband light image 10 into a hyper-spectral light image 11 having numerous wavelength separated components: narrowband light image at $\lambda_a$ 11a, narrowband light image at $\lambda_b$ 11b, ..., narrowband light image at $\lambda_f$ 11f. Equivalently although not shown here, other means such as a grating structure could be used to effect the spectral wavelength separation as well. The hyper-spectral light image 11 is then focused onto an areal image sensor 5 having imager row-1 5a, imager row-2 5b, ..., imager row-M 5f corresponding to the numerous wavelength separated components 11a-11f and converting them into output electrical image signals with an overall photoelectric signal gain (GOA) for later analysis. In general, the GOA of an image sensor is defined as the following ratio:

output image signal voltage/incoming image light exposure energy.

As an illustrated example, narrowband light image at $\lambda_a$ 11a might correspond to a wavelength of 400 nanometer (nm), narrowband light image at $\lambda_b$ 11b might correspond to a wavelength of 401 nm and narrowband light image at $\lambda_f$ 11f might correspond to a wavelength of 900 nm. While a conventional areal image sensor implements a uniform GOA for all its sensor pixels, such traditional implementation will result in substantial image signal distortion when applied to the hyper-spectral imaging environment 1. This image signal distortion is rooted in a non-uniform (non-flat) spectral response of practically all photoelectric sensor elements of which a silicon spectral responsivity 15 is qualitatively illustrated in FIG. B. The Y-axis is spectral responsivity in ampere/watt while the X-axis is incoming light wavelength in nm. Thus, as a single cited example, the spectral responsivity near 800 nm is substantially higher than that near 500 nm. More quantitatively, the silicon spectral response variation is close to 5 times at wavelengths of higher responsivity than those at lower responsivity. To correct for this spectral responsivity rooted image signal distortion, post-imager software data compensation has been used in the past. As the post-imager software data compensation normally consumes significant power and energy, it is undesirable in sensitive applications such as satellite. A solution is desired for hyper-spectral imaging that preserves high signal fidelity, is compact and energy efficient.

SUMMARY OF THE INVENTION

An areal active pixel image sensor (AAPS) with programmable row-specific gain is proposed. The AAPS converts an incoming hyper-spectral light image into a corresponding video output signal (VOS). The AAPS includes:

a) An imaging array having M-rows×N-columns (M>1, N>=1) of active pixel sensor (APS) elements $APS_{jk}$ (j=1, 2,...,M and k=1,2,..., N) each capable of photoelectrically converting and integrating an incident pixel light of the hyper-spectral light image into a photoelectric signal $PES_{jk}$ through an integration time period $TNT_{jk}$. The conversion results in a photoelectric signal gain of $GPE_{jk}$.

b) A video output signal conditioner (VOSC), coupled to the imaging array, for multiplexing and amplifying the photoelectric signals $PES_{jk}$ into the VOS with an electric signal gain of $GEE_{jk}$.

c) The VOSC further programmably sets at least one of $GPE_{jk}$ and $GEE_{jk}$ to be row-specific in that:
   c1) In case of row-specific $GPE_{jk}$, for each row index j, $GPE_{j1}=GPE_{j2}=\ldots=GPE_{jN}$.
   c2) In case of row-specific $GEE_{jk}$, for each row index j, $GEE_{j1}=GEE_{j2}=\ldots=GEE_{jN}$.

Consequently, the AAPS exhibits an overall photoelectric signal gain of $GOA_{jk}=GPE_{jk}\times GEE_{jk}$ that is row-specific thus capable of compensating for image signal distortion caused by non-uniform spectral response of the APS elements during hyper-spectral imaging.

For setting the $GEE_{jk}$ to be row-specific, the VOSC further includes:

An electric signal gain (GEE)-calibration memory for storing the row-specific $GEE_{jk}$.

A control interface coupled to the GEE-calibration memory for programming/retrieving the row-specific $GEE_{jk}$ into/from the GEE-calibration memory.

A VOS-generator, coupled to the imaging array and the control interface, for multiplexing and amplifying the photoelectric signals $PES_{jk}$, each by its respective electric signal gain of $GEE_{jk}$ synchronously retrieved from the GEE-calibration memory, into the VOS. The VOS-generator further includes a programmable gain amplifier (PGA) coupled to and amplifies the multiplexed photoelectric signals $PES_{jk}$. In a more specific embodiment, the control interface further includes an inter-integrated circuit (I²C) interface and the PGA is a switched capacitor PGA.

In a refined embodiment, in addition to the $GEE_{jk}$ the VOS-generator further amplifies all the photoelectric signals $PES_{jk}$ by a selectable coarse gain factor $GEE_C$.

In another embodiment, the control interface further sets the AAPS into the following operating modes:
1. Normal imaging mode wherein all the $GEE_{jk}$ are set equal to one (1).
2. Row-specific gain mode wherein each $GEE_{jk}$ is retrieved from the GEE-calibration memory.
3. Power down mode wherein, other than the control interface, all other components of the AAPS are powered down to save power.

In another embodiment, the VOS-generator further includes a serial connection of sample-and-hold (S/H) and analog-to-digital converter (ADC) coupled to the output of the PGA to produce a digital VOS.

In another embodiment, each $APS_{jk}$ further includes a photo-detector element switchably coupled to a serial connection of a resettable capacitive trans-impedance amplifier (CTIA) and a correlated double sampling (CDS) circuit. As a result, each $APS_{jk}$ produces the photoelectric signal $PES_{jk}$ with high photoelectric gain and linearity, substantial absence of Reset kTC noise, fixed pattern noise suppression and minimized effect from dark leakage thus suitable for snap shot imaging with long integration time period $TNT_{jk}$. In a more specific embodiment, the pixel size of each $APS_{jk}$ is from about 20 micron×20 micron to about 150 micron×150 micron.

In another embodiment, the AAPS further includes numerous dummy pixel sensors (DPS) bordering the imaging array for, in combination with the APS elements $APS_{jk}$, dark voltage cancellation (DVC) from the photoelectric signals $PES_{jk}$.

For setting the $GPE_{jk}$ to be row-specific, the VOSC further includes:

A photoelectric signal gain (GPE)-calibration memory for storing the row-specific $GPE_{jk}$.

A control interface coupled to the GPE-calibration memory for programming/retrieving the row-specific $GPE_{jk}$ into/from the GPE-calibration memory.

A VOS-generator coupled to the imaging array and the control interface. The VOS-generator performs the following functions:

c11) Corresponding to each APS element $APS_{jk}$:
1. Synchronously retrieving its row-specific $GPE_{jk}$ from the GPE-calibration memory.
2. Calculating a corresponding integration time period $TNT_{jk}$ that, when applied through the $APS_{jk}$, would cause it to produce the desired row-specific $GPE_{jk}$.
3. Applying the calculated $TNT_{jk}$ through the $APS_{jk}$ to produce a corresponding $PES_{jk}$.

c12) Multiplexing the photoelectric signals $PES_{jk}$ into the VOS.

In another embodiment, the control interface further sets the AAPS into the following operating modes:
1. Normal imaging mode wherein all the $GPE_{jk}$ are set equal to a single pre-determined value.
2. Row-specific gain mode wherein each $GPE_{jk}$ is retrieved from the GPE-calibration memory.
3. Power down mode wherein, other than the control interface, all other components of the AAPS are powered down to save power.

BRIEF DESCRIPTION OF THE DRAWINGS

These and other aspects of the invention will now be described in detail with reference to the accompanying drawings, wherein.

FIG. A and FIG. B illustrate a hyper-spectral imaging environment with an areal image sensor together with its non-uniform spectral response when its photoelectric sensor elements are made of silicon.

DETAILED DESCRIPTION OF THE PREFERRED EMBODIMENTS

The description above and below plus the drawings contained herein merely focus on one or more currently preferred embodiments of the present invention and also describe some exemplary optional features and/or alternative embodiments. The description and drawings are presented for the purpose of illustration and, as such, are not limitations of the present invention. Thus, those of ordinary skill in the art would readily recognize variations, Modifications, and alternatives. Such variations, Modifications and alternatives should be understood to be also within the scope of the present invention.

Figure 1:
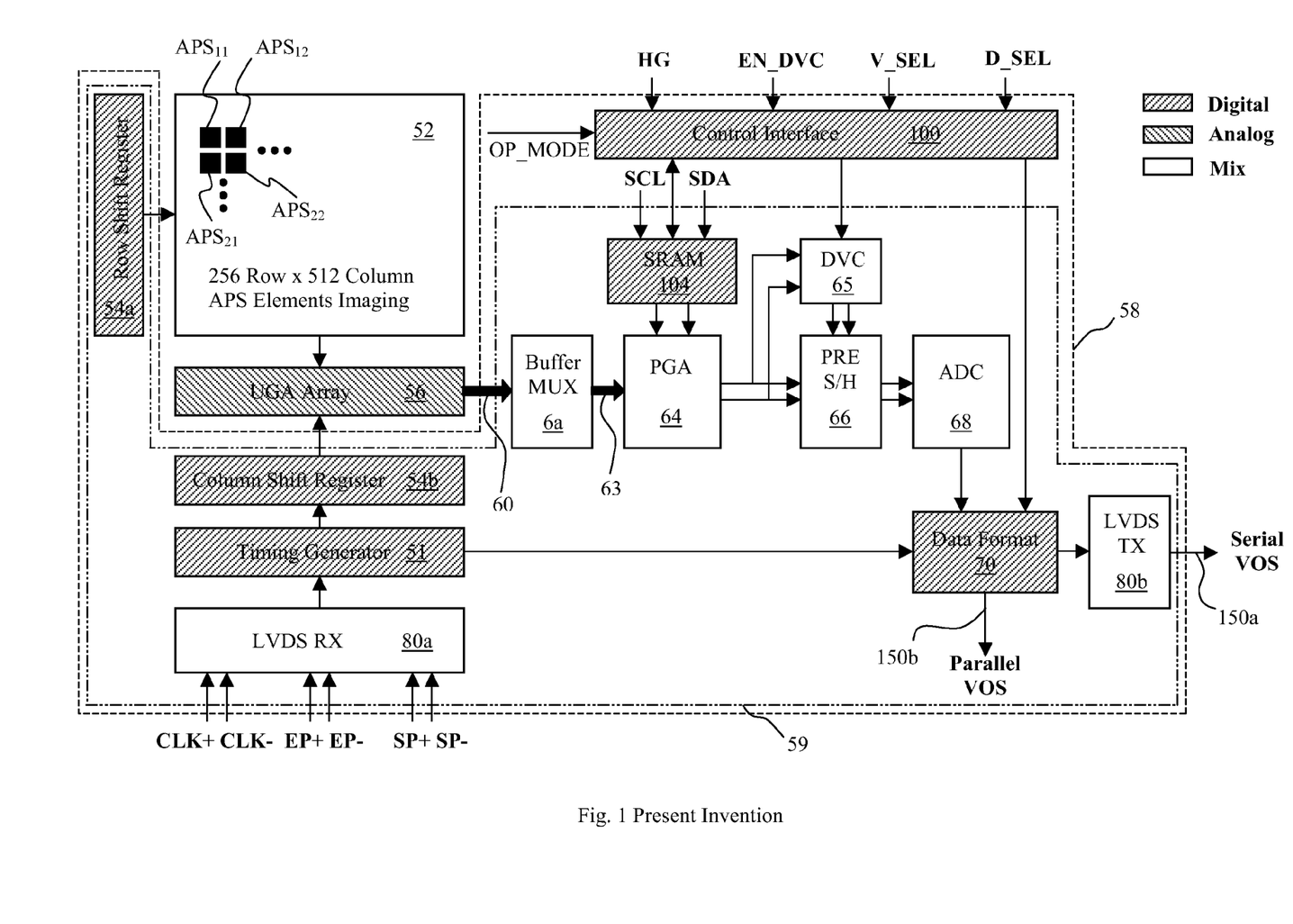
FIG. 1 illustrates an overall architecture of the present invention areal active pixel image sensor (AAPS) with programmable row-specific gain having an imaging array, a control interface and a video output signal (VOS)-generator.

FIG. 1 illustrates an overall architecture of the present invention areal active pixel image sensor (AAPS) 50 with programmable row-specific gain. The AAPS 50 converts an incoming hyper-spectral light image 11 (see FIG. A) into a corresponding video output signal (VOS) that can be either a serial VOS 150a or a parallel VOS 150b by selection. The AAPS 50 is a mixed signal photoelectric imaging system with its numerous analog, digital and mixed signal functional components marked with corresponding cross hatches for clarity of illustration. The AAPS 50 has an areal imaging array 52 for photoelectrically converting and integrating an incident pixel light of the hyper-spectral light image 11 into a corresponding photoelectric signal. For this particular case of illustration, the imaging array 52 has 512-rows×256-columns of active pixel sensor (APS) elements $APS_{jk}$ (j=1,2, ..., 512 and k=1,2, ..., 256) each capable of photoelectrically converting and integrating an incident pixel light through an integration time period $TNT_{jk}$ into a corresponding photoelectric signal $PES_{jk}$ with a photoelectric signal gain of $GPE_{jk}$. More structural details of the APS will be presently described. The AAPS 50 has a video output signal conditioner (VOSC) 58, itself having a unity gain amplifier (UGA) array 56 coupled to the imaging array 52, for multiplexing and amplifying the photoelectric signals $PES_{jk}$ into the VOS with an electric signal gain of $GEE_{jk}$.

Importantly, the VOSC 58 can programmably set at least one of the $GPE_{jk}$ and $GEE_{jk}$ to be row-specific. That is, in the case of row-specific $GPE_{jk}$, for each row index j:

$$GPE_{j1}=GPE_{j2}=\ldots=GPE_{j256}$$

On the other hand, in the case of row-specific $GEE_{jk}$, for each row index j:

$$GEE_{j1}=GEE_{j2}=\ldots=GEE_{j256}$$

In this way, the AAPS 50 exhibits an overall photoelectric signal gain of:

$$GOA_{jk}=GPE_{jk} \times GEE_{jk}$$

that is row-specific hence capable of compensating for signal distortion during hyper-spectral imaging. In a specific preferred embodiment the $GEE_{jk}$ can be set within a range of 1 to 5 with a 7-bit resolution for gain increment. The VOSC 58 further includes a control interface 100 and a video output signal (VOS)-generator 59. The control interface 100 is coupled to a GEE-calibration memory, static random access memory (SRAM) 104, of the VOS-generator 59 for programming and retrieving the row-specific $GEE_{jk}$ into and from the SRAM 104. Hence, the SRAM 104 stores gain compensation data corresponding to the spectral response characteristics of the APS elements. In a preferred embodiment, the control interface 100 is an Inter-Integrated Circuit ($I^2C$) interface, an industry standard interface commonly used in the field of integrated circuits. The various signal components of the control interface 100 are:

- HG for selecting a discrete value of coarse electric signal gain GEE
- EN_DVC for enabling a dark voltage cancellation (DVC) 65 circuitry of the VOS-generator 59
- V_SEL for selecting an input voltage source to an analog-to-digital converter (ADC) 68 of the VOS-generator 59
- D_SEL for selecting a VOS data format (serial VOS 150a or parallel VOS 150b)
- OP_MODE for setting the AAPS 50 into various operating modes The status of the above numerous device settings are further readable through the control interface 100. The various functional components of the VOS-generator 59 are further described next. Low voltage differential signal receiver (LVDS RX) 80a inputs the following differential signals for underlying system clocking and photoelectric signal conversion and integration by the APS:

| | |
|---|---|
| CLK+, CLK– | System clock base |
| EP+, EP– | APS exposure control pulse input |
| SP+, SP– | APS start pulse input |

Reference is made to U.S. Ser. No. 11/869,732 for further details of the timing mechanism of the APS photoelectric signal conversion and integration process. Timing generator 51 takes input from the LVDS RX 80a and generates additionally required operational timing signals internal to the VOSC 58 for the following functions:

- Various operating modes
- Imaging array 52 control
- APS photoelectric signal readout
- Automatic exposure control, DVC and gain control
- ADC and data formatting
- row-specific gain loading via control interface 100
- External output timing for VOS In particular, the timing generator 51 generates the timing signals for synchronously clocking a row shift register 54a, a column shift register 54b and a data accessing address of the SRAM 104. The row shift register 54a and the column shift register 54b, both coupled to the imaging array 52, in turn cause a corresponding sequential, pixel-by-pixel readout of photoelectric signals $PES_{jk}$ from the imaging array 52. The thus clocked out photoelectric signals $PES_{jk}$, after going through the UGA array 56 and a buffer multiplexer (MUX) 62, get amplified by a programmable gain amplifier (PGA) 64 with its gain equal to a corresponding row-specific electric signal gain $GEE_{jk}$ read from the SRAM 104. In this way, the AAPS 50 realizes the case of row-specific $GEE_{jk}$ compensating for image signal distortion caused by non-uniform spectral response of the APS elements during hyper-spectral imaging.

Although not specifically illustrated here to avoid excessive obscuring details, to those skilled in the art, the alternative case of row-specific $GPE_{jk}$ compensating for image signal distortion can be implemented by instead storing then retrieving row-specific integration time period $TNT_{jk}$ via the SRAM 104. The row-specific $TNT_{jk}$ is then used for photoelectric signal conversion and integration into photoelectric signals $PES_{jk}$ by the active pixel sensor elements $APS_{jk}$. For simplicity of implementation here, the PGA 64 gain can now be set equal to a pre-determined constant. Alternatively, the SRAM 104 can be used to store then retrieve row-specific $GPE_{jk}$. Corresponding to each $APS_{jk}$, the VOS-generator 59 can then:

1. Synchronously retrieve its row-specific $GPE_{jk}$ from SRAM 104.
2. Calculate a corresponding integration time period $TNT_{jk}$ that, when applied through the $APS_{jk}$, would cause it to produce the desired row-specific $GPE_{jk}$. The calculation can also amount to a table look up based upon a pre-determined calibration data of the $APS_{jk}$.
3. Apply the calculated $TNT_{jk}$ through the $APS_{jk}$ to produce a desired $PES_{jk}$.

Coupled to the output of PGA 64 is a serial connection of sample-and-hold (S/H) 66, analog-to-digital converter (ADC) 68 and data format 70 for converting the now properly amplified analog photoelectric signals into their digital representation and formatting the digital representation for final output. In one preferred embodiment, the ADC 68 is of 12-bit pipeline type for its high speed, high accuracy and low noise characteristics. The final output is selectable between a parallel VOS 150b and a serial VOS 150a delivered through an Low voltage differential signal transmitter (LVDS TX) 80b for increased noise immunity. As briefly mentioned before, the function of a dark voltage cancellation (DVC) 65 circuitry can be enabled through signal component EN_DVC of the control interface 100. More details of dark voltage cancellation will be presently described.

As briefly mentioned before, the AAPS 50 can be set with control signal OP_MODE to operate in the following modes:

1. Normal imaging mode.
2. Row-specific gain mode.
3. Power down mode.

In normal imaging mode all $GEE_{jk}$ are set equal to one (1) with the AAPS 50 behave like a traditional areal imager with no row-specific gain for spectral response compensation. In row-specific gain mode the $GEE_{jk}$ are retrieved from the SRAM 104 thus made row-specific as described above. However, in power down mode, other than the control interface 100 itself, all other components of the AAPS 50 are powered down to save electrical power.

Figure 2:
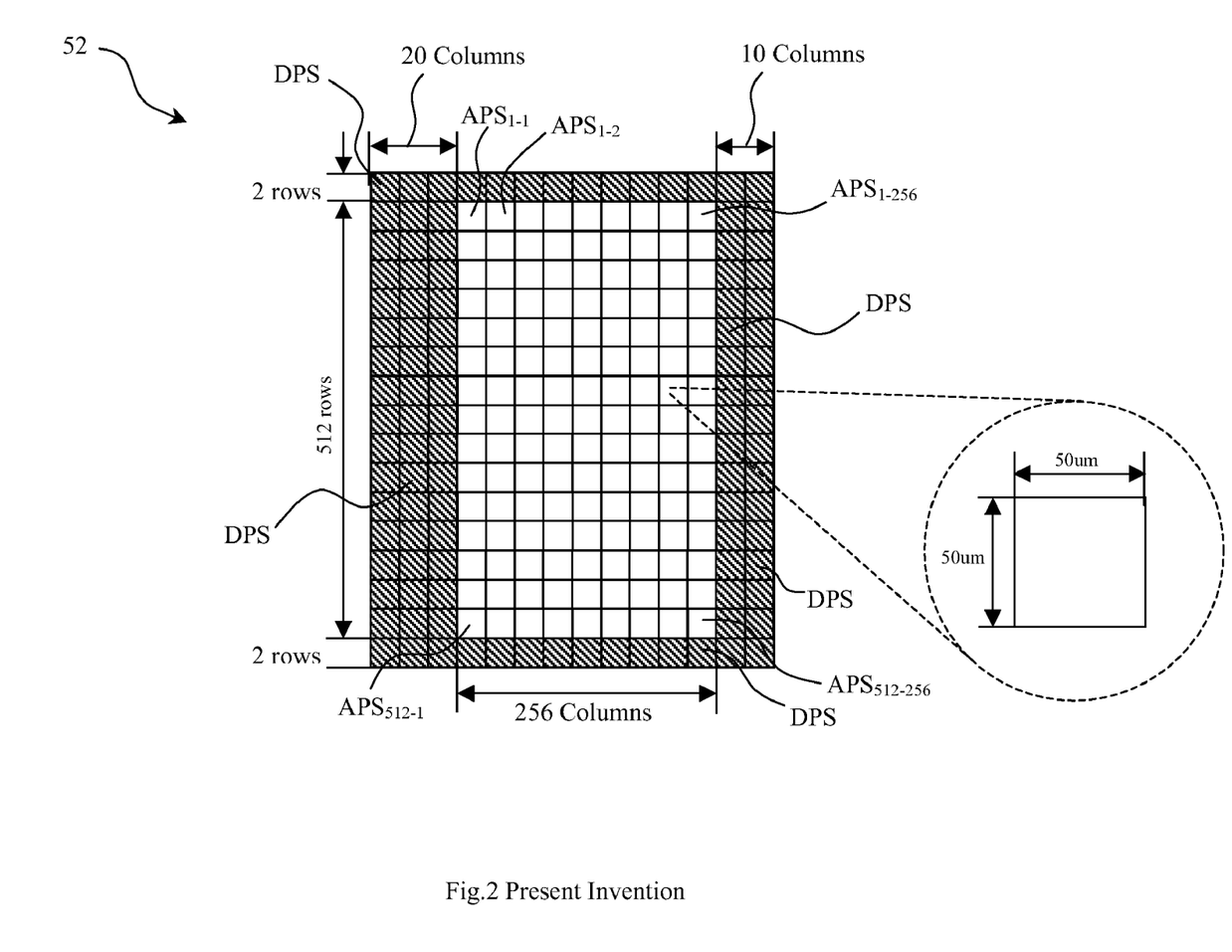
FIG. 2 illustrates, as part of the AAPS, an imaging array of active pixel sensor (APS) elements plus numerous dummy pixel sensors (DPS) bordering the imaging array for dark voltage cancellation (DVC) from the APS photoelectric signals.

FIG. 2 illustrates a specific example of the imaging array 52 of active pixel sensor (APS) elements plus numerous dummy pixel sensors (DPS) bordering the imaging array 52. The imaging array 52 has an active image array size of 512 rows×256 columns APS elements: $APS_{1-1}$, $APS_{1-2}$, . . . , $APS_{512-1}$, $APS_{512-2}$, . . . , $APS_{512-256}$. However, the imaging array 52 contains additional DPS elements bordering the active image array for, in combination with the $APS_{jk}$ elements, dark voltage cancellation from the photoelectric signals $PES_{jk}$. The DPS elements are the same as the $APS_{jk}$ elements except for their coverage with a light shielding opaque material hence they function to provide a dark reference voltage and to eliminate an associated edge effect. More discussion on DVC will be presently described. Including the DPS elements, the full imaging array 52 has a total of 516 rows and 286 columns, with extra 4 DPS rows 30 DPS columns. As illustrated by the inset, each APS element has a 50 micron×50 micron pixel size with a 50 micron elemental pitch along both horizontal and vertical direction. This pixel size is substantially larger than that employed in a traditional areal imager (about 5 micron×5 micron), for reasons to be presently described.

Figure 3:
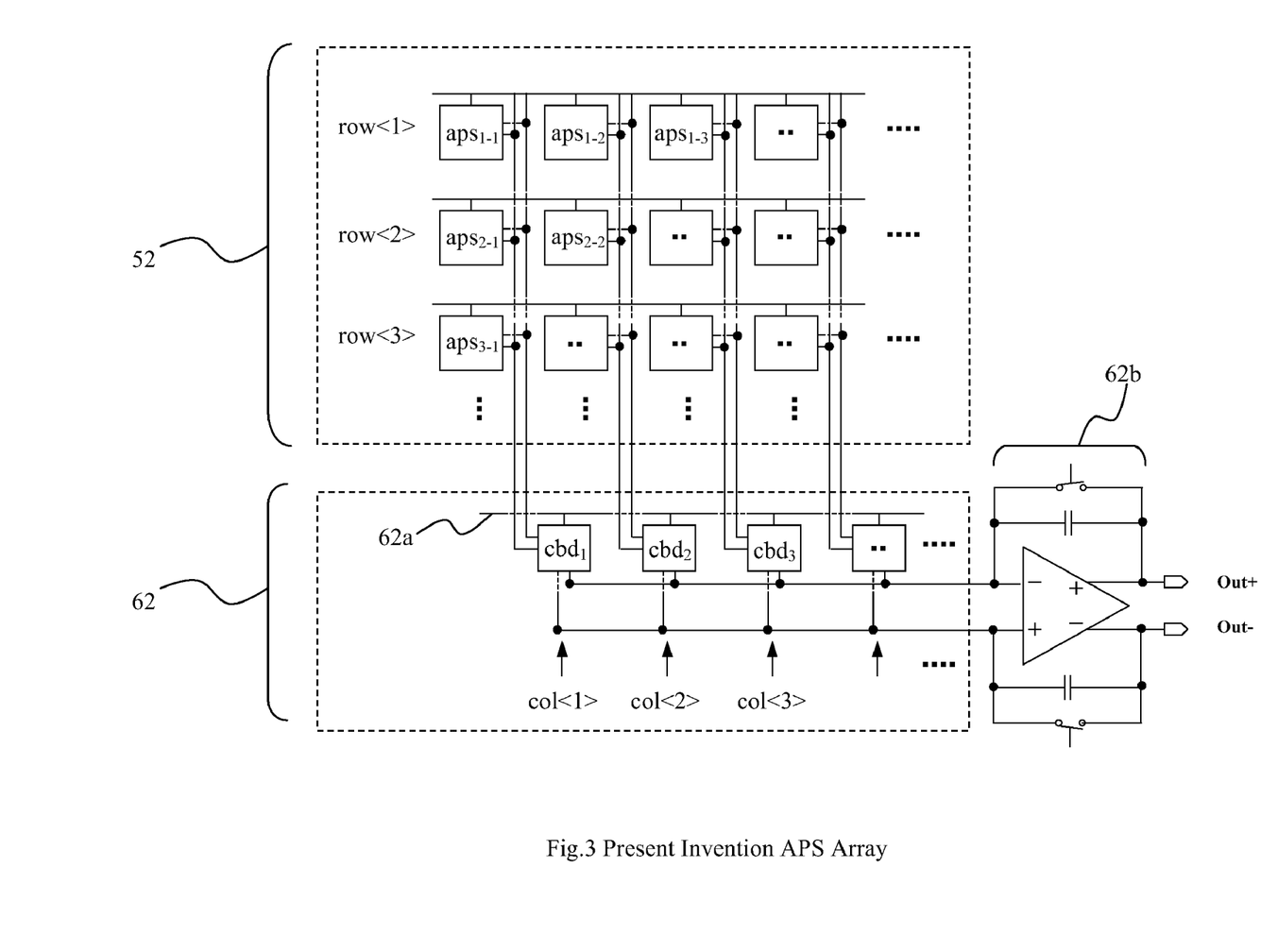
FIG. 3 is a block diagram illustrating the circuit architecture of the imaging array plus an output signal buffer multiplexer.

FIG. 3 is a block diagram illustrating the circuit architecture of the imaging array 52 plus an output signal buffer multiplexer (MUX) 62. As remarked before, the imaging array 52 has 516 row×286 column networked APS elements: $APS_{1-1}$, $APS_{1-2}$, $APS_{1-3}$, $APS_{1-4}$, .... Each $APS_{jk}$ element photoelectrically converts and integrates a corresponding incident pixel light into a photoelectric signal $PES_{jk}$. The buffer MUX 62 further includes a serial connection of array signal dump 62a and dual charge integrating buffer amplifier 62b for isolating parasitic capacitance at each $APS_{jk}$ output line. The array signal dump 62a includes 286 column buffer drivers (CBD) each for a column of APS elements of the imaging array 52: $CBD_1$, $CBD_2$, ..., $CBD_{286}$. As all APS signals of the imaging array 52 go through the single dual charge integrating buffer amplifier 62b, the fixed pattern noise is essentially eliminated.

Figure 4:
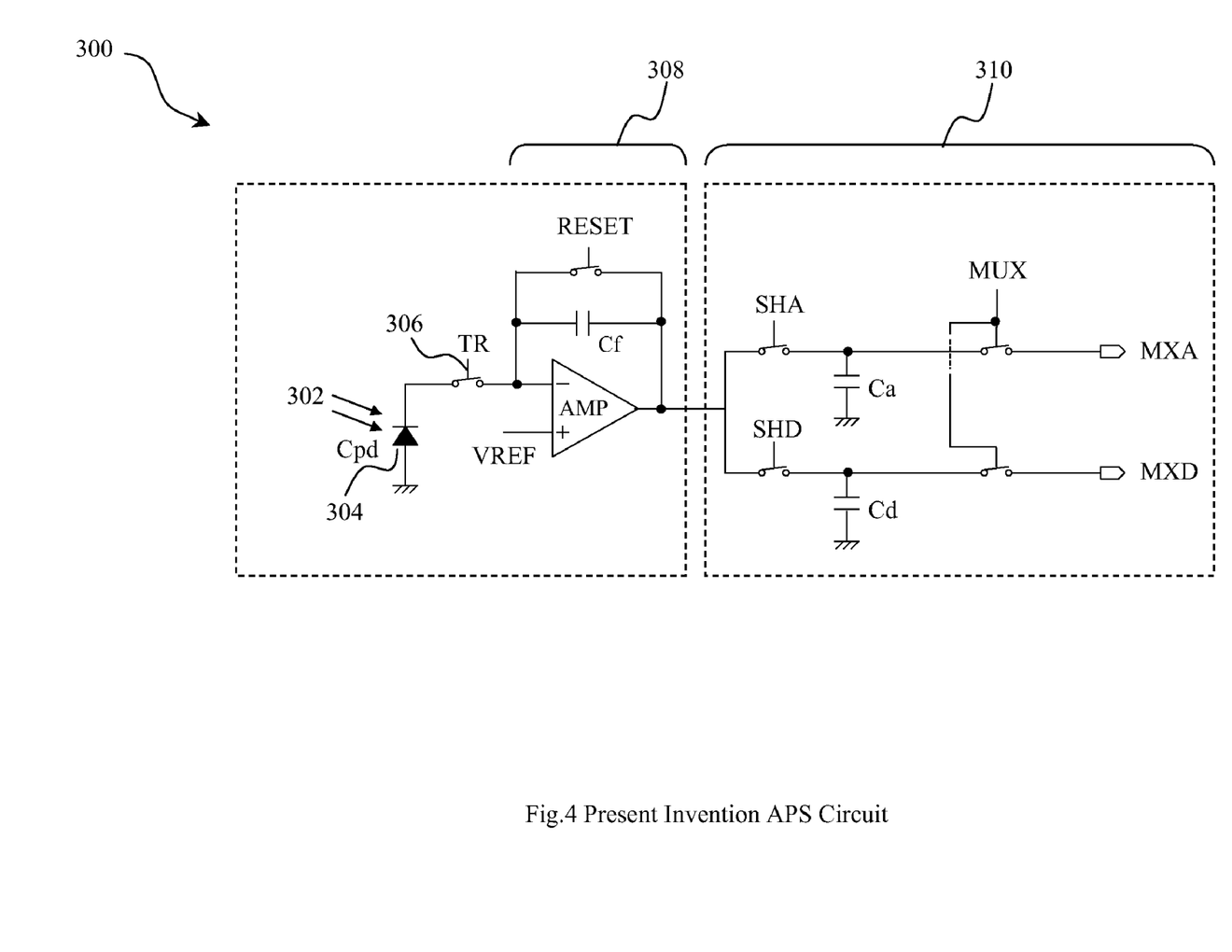
FIG. 4 illustrates a next level circuit detail of each APS element.

FIG. 4 illustrates a next level circuit detail of APS 300 for photoelectric signal conversion and integration. As the light intensity of hyper-spectral light image 11 is usually very low, it requires both snap shot image capture and a long integration time, normally longer than 1 second. For those skilled in the art, snap shot image capture means simultaneously starting and stopping photoelectric signal conversion and integration for all pixels of the imaging array 52. To meet these requirements, each APS 300 is designed to have a photo-detector element 304 switchably coupled, through a transfer control switch 306, to a serial connection of a resettable capacitive trans-impedance amplifier (CTIA) 308 and a correlated double sampling (CDS) circuit 310. As described with more details in U.S. Ser. No. 11/869,732, the resulting APS 300, being fully integrated as part of each $APS_{jk}$ element, is capable of photoelectrically converting an incident pixel light 302 with high photoelectric gain and linearity, substantial absence of Reset kTC noise, fixed pattern noise suppression and minimized effect from dark leakage thus suitable for both snap shot image capture with a long integration time period TNT exceeding 1 second. On the other hand, due to this high level of photoelectric circuit integration into each $APS_{jk}$ element, its pixel size can range from about 20 micron×20 micron to about 150 micron×150 micron that is substantially larger than an otherwise traditional areal imager pixel (about 5 micron×5 micron).

Figure 5:
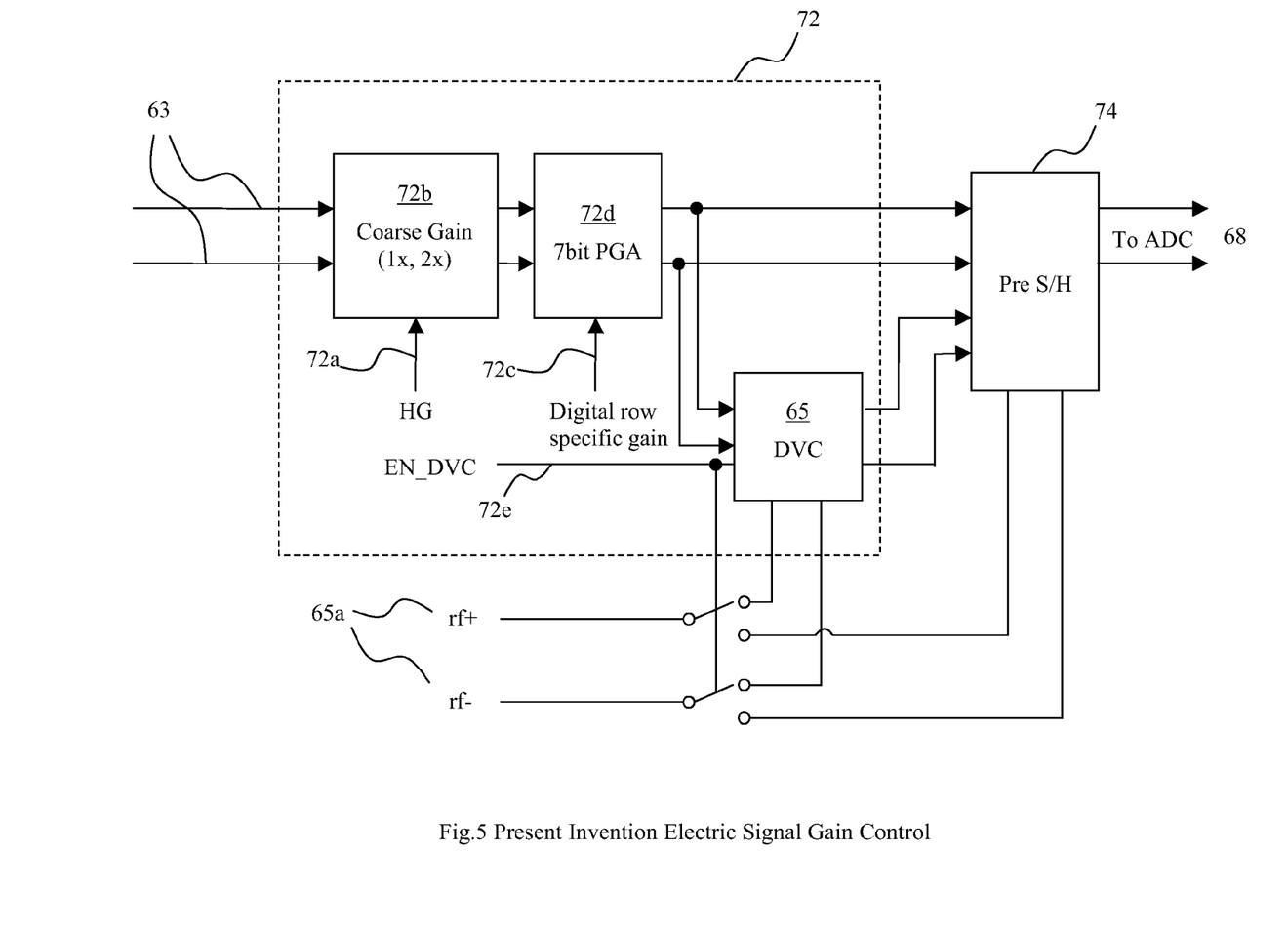
FIG. 5 is a partial block diagram of the VOS-generator illustrating DVC and the amplification of photoelectric signals by a selectable coarse gain plus a programmable fine gain with a programmable gain amplifier (PGA)

FIG. 5 is a partial block diagram of the VOS-generator 59 illustrating dark voltage cancellation and a gain stage 72 that amplifies buffered differential photoelectric signals 63 by a selectable coarse gain setting HG 72a plus a programmable fine gain with a programmable 7-BIT PGA 72d. The gain stage 72 has a serial connection of coarse gain 72b, 7-BIT PGA 72d and dark voltage cancellation DVC 65. Depending upon the coarse gain setting HG 72a, the coarse gain 72b amplifies the buffered PES 63 by a selectable, discrete coarse gain factor $GEE_C$. In one embodiment, the coarse gain setting HG 72a is 1-bit with $GEE_C$ being either ×1 or ×2. In another embodiment, the 7-BIT PGA 72d further amplifies the buffered PES 63 by a selectable, fine gain factor $GEE_F$ within a range of ×1 to ×5 according to the value of the 7-bit row-specific gain setting 72c. Under the control of digital signal EN_DVC 72e, the DVC 65 circuitry can be optionally enabled or disabled (bypassed). When DVC 65 is bypassed, the output of 7-BIT PGA 72d gets subtracted with subtract output range 74, by an amount equal to a differential dark reference signal V(rf)=V(rf+)−V(rf−) 65a, and is then sent to the ADC 68. However, when the DVC 65 is enabled, the subtracted amount would equal to the average value of an adder inside the DVC 65. With the DVC 65 enabled, its operating mechanism is further described next.

The photoelectric charge ($Q_d$) generated from a dark leakage current $I_d$ of a dummy pixel sensor (DPS) is:

$$Q_d = I_d * TNT$$

Where TNT is the photoelectric signal integration time as defined before. The photoelectric charge ($Q_a$) generated from light current $I_1$ of an active pixel sensor (APS) is:

$$Q_a = (I_1 + I_d) * TNT$$

Where $I_1$ is a light current generated from a pixel light while $I_d$ is the dark leakage current of the APS, same as that of the DPS. It follows that the dark voltage generated on the DPS, illustrated here as a differential dark reference signal 65a, is the same as that generated on an APS nearby. Therefore, by clamping the APS photoelectric voltage on its nearby dark reference signal 65a, an undesirable signal distortion due to the dark leakage current $I_d$ is subtracted out from the desired pixel video signal.

Figure 6:
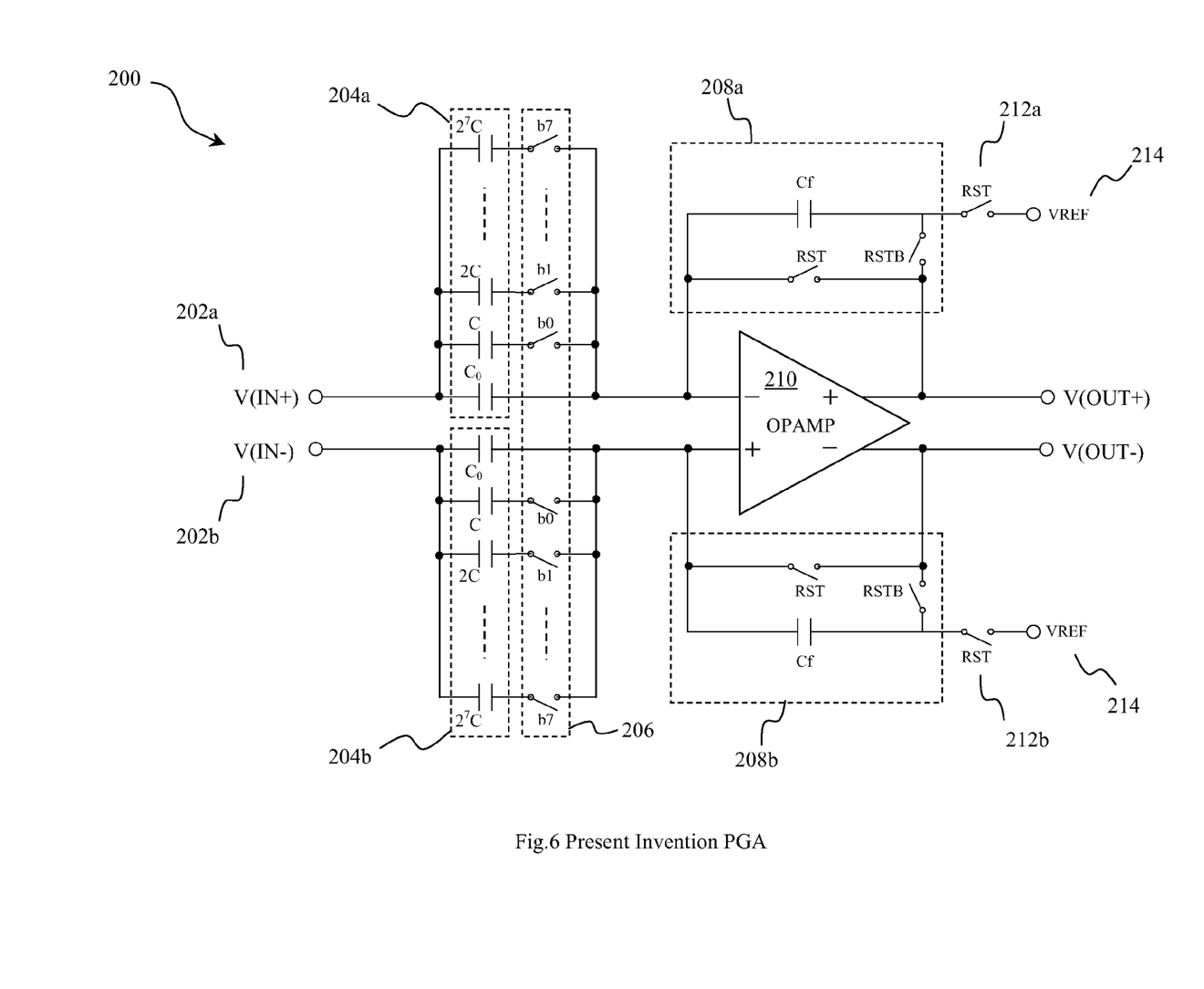
FIG. 6 illustrates an embodiment of the PGA using full differential binary weighted switched-capacitor banks.
Figure 7:
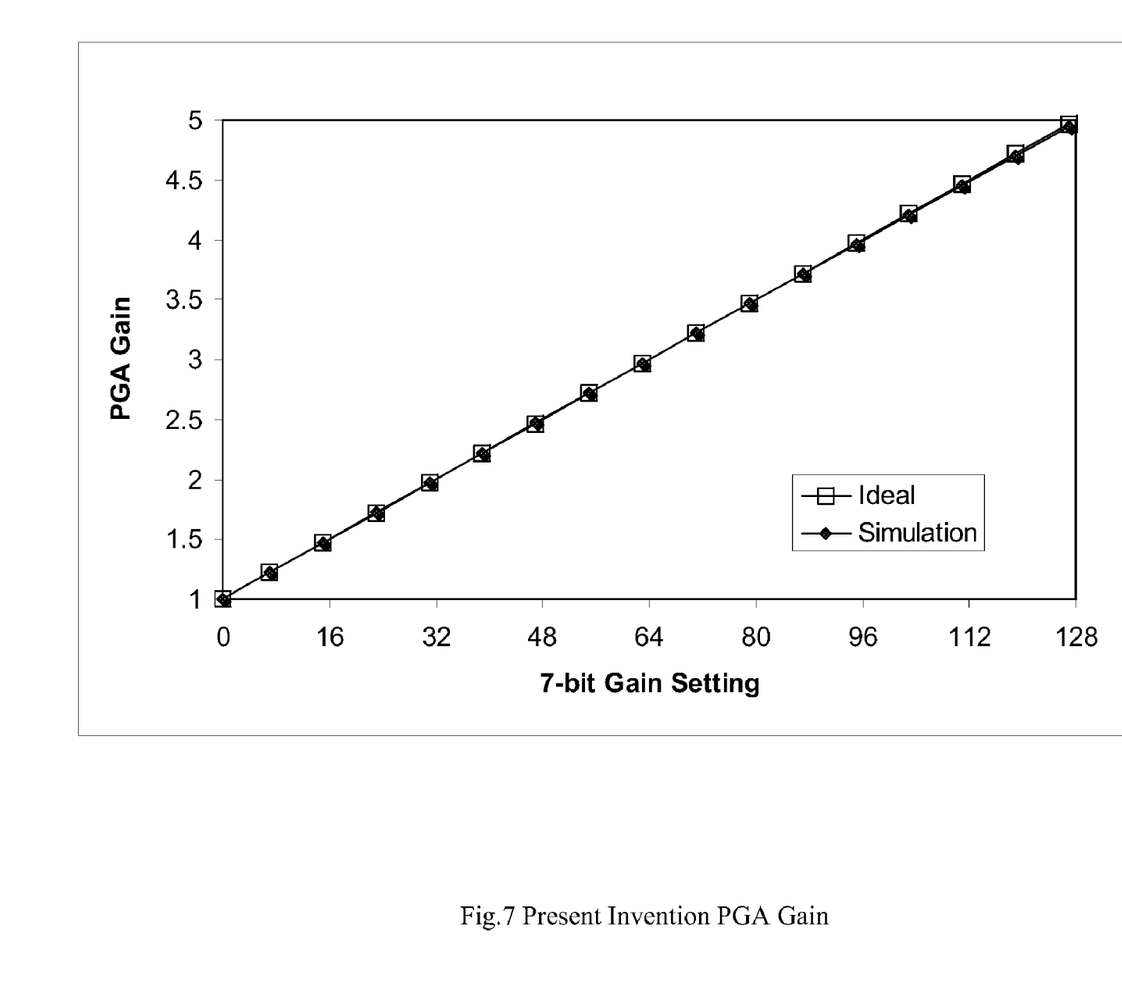
FIG. 7 shows the electric signal gain of the PGA as embodied in FIG. 6.

FIG. 6 illustrates an embodiment of the PGA in the topology of a switched capacitor PGA 200 with differential inputs V(IN+) 202a and V(IN−) 202b for high noise immunity. The switched capacitor PGA 200 employs full differential binary weighted switched-capacitor banks +side binary capacitor bank 204a and −side binary capacitor bank 204b at its input side. Both capacitor banks 204a and 204b are switchably controlled for a desired equivalent capacitance value under a 7-bit gain control 206. Next, a +side resettable charge integration loop 208a and a −side resettable charge integration loop 208b couple with an operational amplifier (OpAmp) 210 and the capacitor banks 204a and 204b deliver final PGA differential outputs V(OUT+) and V(OUT−) with the following generalized transfer function:

$$V(\text{out}) = -\frac{C(2^0 b_0 + 2^1 b_1 + \ldots + 2^{n-1} b_{n-1}) + C_0}{Cf} * V(\text{in})$$

where (b0, b1, ..., bn−1) is an n-bit binary vector reflecting the switching state (open/close) of the capacitor banks 204a and 204b. $C_O$ is a fixed capacitor for setting the minimum gain of the switched capacitor PGA 200 when b0=b1= ... =bn−1=0. C is a capacitance unit defining the quantization of capacitance range used in the switched capacitor PGA 200. The differential outputs V(OUT+) and V(OUT−) of the switched capacitor PGA 200 are further resettable through reference reset switches 212a, 212b and a reference voltage VREF 214. In this particular embodiment, the electric signal gain of the switched capacitor PGA 200 is programmable through a range from ×1 to ×5 with a 7-bit resolution. The electric signal gain of the switched capacitor PGA 200 is shown in FIG. 7. The associated gain non-linearity is better than 0.1%.

While the invention has been described in detail by reference to the preferred embodiment described above, it is understood that variations and modifications thereof may be made without departing from the true spirit and scope of the invention.

What is claimed is:

1. An areal active pixel image sensor (AAPS) with programmable row-specific gain for converting an incoming hyper-spectral light image into a corresponding video output signal (VOS), the AAPS comprises:

a) an imaging array further comprising M-rows×N-columns (M>1, N>=1) of active pixel sensor (APS) elements $APS_{jk}$ (j=1,2, . . . ,M and k=1,2, . . . , N) each capable of photoelectrically converting and integrating an incident pixel light of the hyper-spectral light image, through an integration time period $TNT_{jk}$, into a corresponding photoelectric signal $PES_{jk}$ with a photoelectric signal gain of $GPE_{jk}$;

b) a video output signal conditioner (VOSC), coupled to the imaging array, for multiplexing and amplifying said photoelectric signals $PES_{jk}$ into the VOS with an electric signal gain of $GEE_{jk}$; and c) said VOSC further programmably sets at least one of said $GPE_{jk}$ and $GEE_{jk}$ to be row-specific in that:
  c1) in case of row-specific $GPE_{jk}$, for each row index j, $GPE_{j1}=GPE_{j2}=\ldots=GPE_{jN}$; and
  c2) in case of row-specific $GEE_{jk}$, for each row index j, $GEE_{j1}=GEE_{j2}=\ldots=GEE_{jN}$ whereby the AAPS exhibits an overall photoelectric signal gain of $GOA_{jk}=GPE_{jk} \times GEE_{jk}$ that is row-specific hence capable of compensating for a problem caused by non-uniform spectral response of the APS elements during hyper-spectral imaging.

2. The AAPS of claim 1, where said $GEE_{jk}$ are set to be row-specific, the VOSC further comprises:
  an electric signal gain (GEE)-calibration memory for storing the row-specific $GEE_{jk}$;
  a control interface coupled to the GEE-calibration memory for programming/retrieving the row-specific $GEE_{jk}$ into/from the GEE-calibration memory; and
  a VOS-generator, coupled to the imaging array and the control interface, for multiplexing and amplifying said photoelectric signals $PES_{jk}$, each by its respective electric signal gain of $GEE_{jk}$ synchronously retrieved from the GEE-calibration memory, into the VOS.

3. The AAPS of claim 2 wherein, in addition to the $GEE_{jk}$, the VOS-generator further amplifies all said photoelectric signals $PES_{jk}$ by a selectable coarse gain factor $GEE_C$.

4. The AAPS of claim 2 wherein the VOS-generator further comprises a programmable gain amplifier (PGA) coupled to and amplifies the multiplexed photoelectric signals $PES_{jk}$.

5. The AAPS of claim 4 wherein said PGA is a switched capacitor PGA.

6. The AAPS of claim 2 wherein said control interface further sets the AAPS into the following operating modes:
  1) normal imaging mode wherein all said $GEE_{jk}$ are set equal to one (1);
  2) row-specific gain mode wherein each $GEE_{jk}$ is retrieved from the GEE-calibration memory; and
  3) power down mode wherein, other than the control interface, all other components of the AAPS are powered down to save power.

7. The AAPS of claim 4 wherein the VOS-generator further comprises a serial connection of sample-and-hold (S/H) and analog-to-digital converter (ADC) coupled to the output of said PGA to produce a digital VOS.

8. The AAPS of claim 2 wherein said control interface further comprises an inter-integrated circuit ($I^2C$) interface.

9. The AAPS of claim 1 wherein each $APS_{jk}$ further comprises a photo-detector element switchably coupled to a serial connection of a resettable capacitive trans-impedance amplifier (CTIA) and a correlated double sampling (CDS) circuit whereby said $APS_{jk}$ produces the photoelectric signal $PES_{jk}$ with high photoelectric gain and linearity, substantial absence of Reset kTC noise, fixed pattern noise suppression and minimized effect from dark leakage thus suitable for snap shot imaging with long integration time period $TNT_{jk}$.

10. The AAPS of claim 9 further comprises a plurality of dummy pixel sensors (DPS) bordering the imaging array for, in combination with the APS elements $APS_{jk}$, dark voltage cancellation (DVC) from the photoelectric signals $PES_{jk}$.

11. The AAPS of claim 9 where the pixel size of each $APS_{jk}$ is from about 20 micron×20 micron to about 150 micron×150 micron.

12. The AAPS of claim 1, where said $GPE_{jk}$ are set to be row-specific, the VOSC further comprises:
  a photoelectric signal gain (GPE)-calibration memory for storing the row-specific $GPE_{jk}$;
  a control interface coupled to the GPE-calibration memory for programming/retrieving the row-specific $GPE_{jk}$ into/from the GPE-calibration memory; and
  a VOS-generator, coupled to the imaging array and the control interface, for,
  c11) corresponding to each APS element $APS_{jk}$:
    1) synchronously retrieving its row-specific $GPE_{jk}$ from the GPE-calibration memory;
    2) calculating a corresponding integration time period $TNT_{jk}$ that, when applied through the $APS_{jk}$, would cause it to produce the desired row-specific $GPE_{jk}$; and
    3) applying the calculated $TNT_{jk}$ through the $APS_{jk}$ to produce a corresponding $PES_{jk}$; and
  c12) multiplexing the photoelectric signals $PES_{jk}$ into the VOS.

13. The AAPS of claim 12 wherein said control interface further sets the AAPS into the following operating modes:
  1) normal imaging mode wherein all said $GPE_{jk}$ are set equal to a single pre-determined value;
  2) row-specific gain mode wherein each $GPE_{jk}$ is retrieved from the GPE-calibration memory; and
  3) power down mode wherein, other than the control interface, all other components of the AAPS are powered down to save power.

14. The AAPS of claim 12 wherein the VOS-generator further comprises a serial connection of sample-and-hold (S/H) and analog-to-digital converter (ADC) to produce a digital VOS.

15. The AAPS of claim 12 wherein said control interface further comprises an inter-integrated circuit ($I^2C$) interface.

* * * * *